Nov. 12, 1968

R. L. WATTERS 3,410,998

ELECTRICAL CONTROL CIRCUIT FOR A SCANNING
MONOPOLE MASS ANALYZER

Filed Sept. 27, 1965

Inventor:
Robert L. Watters,
by John F. Ahern
His Attorney.

Inventor:
Robert L. Watters,
by John F. Ahern
His Attorney

Inventor:
Robert L. Watters,
by John F. Allen
His Attorney.

United States Patent Office 3,410,998
Patented Nov. 12, 1968

3,410,998
ELECTRICAL CONTROL CIRCUIT FOR A SCANNING MONOPOLE MASS ANALYZER
Robert L. Watters, Schenectady, N.Y., assignor to General Electric Company, a corporation of New York
Continuation-in-part of application Ser. No. 426,832, Jan. 21, 1965. This application Sept. 27, 1965, Ser. No. 490,615
4 Claims. (Cl. 250—41.9)

ABSTRACT OF THE DISCLOSURE

An electrical control circuit for supplying a regulated voltage to a monopole mass analyzer or filter capable of sweeping through a mass range of up to 600 to 1 includes an oscillator for generating an alternating voltage, a voltage divider for sampling a portion of the alternating voltage, a rectifier for transforming the sample portion into a unidirectional voltage, a servo circuit for regulating the unidirectional voltage to a preselected and selectable fraction of the alternating voltage and a sweep circuit for simultaneously sweeping the absolute values of the unidirectional and alternating voltages through a preselected range without altering the relative values of the alternating and unidirectional voltages to one another.

---

This application is a continuation-in-part of my co-pending application, Ser. No. 426,832, filed Jan. 21, 1965, and now abandoned.

The present invention relates to electrical control circuits for providing an alternating current voltage together with a unidirectional voltage that has a magnitude of predetermined proportion to the alternating current voltage which is regulated relative to the alternating current voltage, and both of which are regulated to an absolute and predetermined value, and for means to periodically vary said voltages in a predetermined fashion as, for example to provide a sweeping voltage. More specifically, the electrical circuits of the present invention may be utilized to provide a closely controlled and regulated voltage supply for a monopole mass analyzer or filter.

In mass analysis the primary tool is the mass spectrometer, a device in which constituents of a gas to be analyzed, or ions, of a preselected charge-to-mass ratio are separated from other ions by interaction of electrical acceleration and a magnetic field through which the particles are accelerated. A recent departure from the principle utilizing magnetic deflection for mass analysis was a device identified as the quadrupole, in which a beam of ions is longitudinally accelerated along and within an array of four parallel rods to which balanced electrical potentials are applied. A later development in this field is the monopole, in which a single conducting metallic rod is partially surrounded by a metallic shield in the form of a V, which simulates the zero equipotential lines in the quadrupole. Ions are electrically accelerated axially between the metallic rod and the metallic shield. A predetermined set of voltages is applied to the conducting rod. In general, the voltages applied comprise an alternating voltage with a unidirectional voltage component, which is of predetermined fraction of the peak value of the alternating current voltage. As set forth in the art, depending upon the magnitude of either or both of the applied voltages, the proportional relationship therebetween, or the frequency of the applied alternating current voltage, a particular mass may be chosen out of those directed along the length of the monopole and for collection by a collector so that a signal is generated indicative of the concentration of the selected mass. By varying any of the aforementioned parameters different masses may be chosen to be incident upon the detector. By a predetermined and regular varying or a cyclic varying of one or more of the above parameters, a range of masses may be swept so that an analysis over a wide range of masses may be conducted in a predetermined period of time. For a further description of the principle of the monopole itself, reference is herewith made to an article published in the Review of Scientific Instruments by Von Zahn, vol. 34, p. 1 (1963).

In general, monopole analyzers or filters of the prior art have suffered in that stability and response time has been poor and the ability to sweep a wide range of masses has been lacking. The problems attendant to the production of a stable, useful and accurate monopole analyzer are problems of producing a pair of correlated alternating and unidirectional voltages having a predetermined absolute and relative magnitudes and for providing means for adjusting these magnitudes as, for example, by sweeping. These problems are not unique to monopole analyzers and, by the same token, the circuits produced thereby are not limited in utility to monopole analyzers only.

Accordingly, it is an object of the present invention to provide electronic circuits for providing interrelated, alternating and unidirectional voltages which have a preselected magnitude relationship and which may be varied or adjusted.

A further object of the present invention is to provide electronic circuits for the production of stable, highly accurate voltages of unidirectional and alternating currents having predetermined magnitude relationships.

A further object of the invention is to provide an improved, highly accurate and stable source of alternating and unidirectional operating voltages for a monopole mass analyzer or filter.

In accord with the present invention, I provide an electronic voltage source for a monopole mass filter or analyzer which is capable of rapidly sweeping through a mass range as high as 600 to 1 with great stability and accuracy and including a high voltage, high frequency voltage generator that is amplitude modulated and which includes means for providing a unidirectional component to the alternating voltage, means for accurately regulating the unidirectional voltage to a preselected fraction which conveniently may be approximately $\frac{1}{10}$ of the peak amplitude of the alternating current voltage and means for changing the absolute values of both voltages without changing their relative magnitude relationship.

The novel features believed characteristic of the present invention are set forth in the appended claims. The invention itself, together with further advantages and objectives thereof, may be more fully understood by reference to the following drawings in which:

Figure 1:
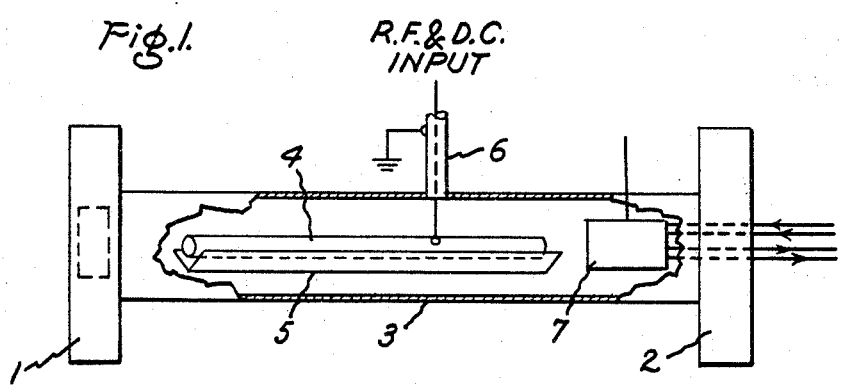
FIGURE 1 is a diagrammatic representation of a monopole mass analyzer or filter.

A monopole mass analyzer or filter is illustrated in diagrammatic form in FIGURE 1 of the drawing. In FIGURE 1, the monopole comprises a pair of flanged end members 1 and 2 with an evacuable cylindrical enclosure 3 connected therebetween. Enclosure 3 contains therein a single centrally located metallic rod 4 and a V-shaped metallic shield 5 partially enclosing rod 4. A coaxial line 6 enters enclosure 3 at a central portion thereof and the center conductor thereof is connected to rod 4. A source of ions is illustrated schematically by the dashed line enclosure located within flanged end member 1 and in alignment with the space between rod 4 and shield 5. An ion detector means 7 is located at the opposite end of enclosure 3 from flanged end member 1 and is also axially aligned with metallic rod 4 and shield 5. The detector means may conveniently be the electrode structure of a Dumont type 241–119 photomultiplier tube having input leads for supplying power thereto and a pair of output leads for reading information out therefrom. The ion source may be conventional and may conventionally be the same ion source as is disclosed in the copending application of W. D. Davis and T. A. Vanderslice, Serial No. 327,617, filed December 3, 1963 now Patent No. 3,230,362.

In the operation of the present invention ions are emitted into the space between rod 4 and shield 5 and carefully controlled, interrelated alternating and unidirectional voltages are applied through coaxial line 6 to rod 4, resulting in only a single mass-to-charge ratio of ions being transmitted therethrough and incident upon detector 7.

Figure 2:
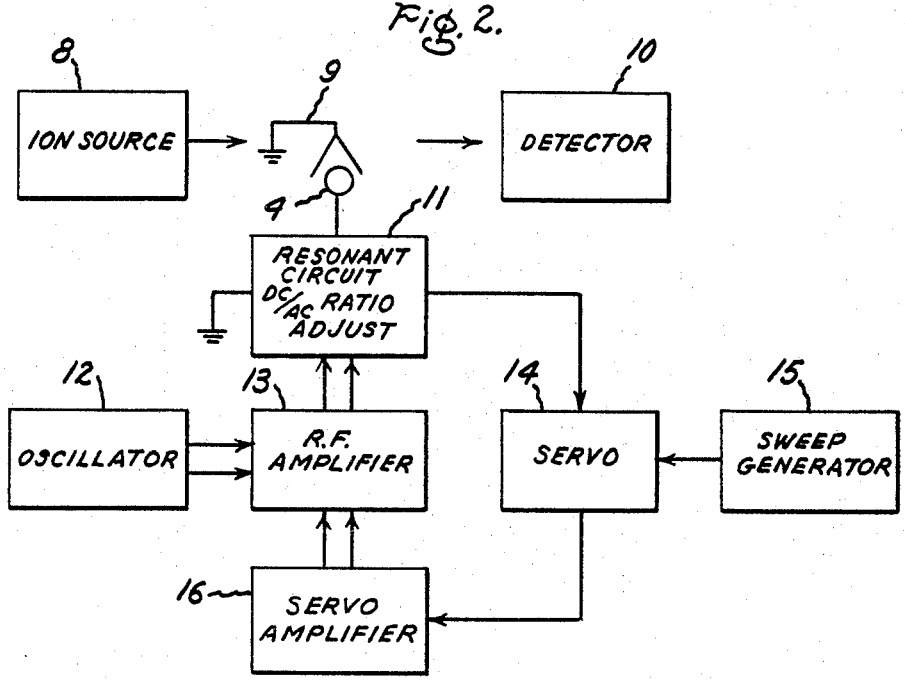
FIGURE 2 is a block diagram of the electrical circuit utilized to provide the controlled voltages in accord with the present invention which may be used for operating a monopole mass analyzer as illustrated in FIGURE 1.

In FIGURE 2 of the drawing, the complete electrical circuit for the operation of a monpole mass analyzer or filter is shown in block diagrammatic form. The filter or analyzer is depicted generally by ion source 8, monopole array 9 and detector 10. Correlated and carefully controlled alternating and unidirectional voltages are applied to monopole rod 4 from the resonant circuit 11. The genesis of the appropriate voltages is found in oscillator 12 which is a crystal controlled oscillator stage for the generation of a regulated radio frequency alternating voltage. This voltage is fed into radio frequency amplifier stage 13 which is a Class C radio frequency amplifier with control grid and screen grid modulation. The amplified radio frequency signal is fed into the resonant circuit stage 11 wherein a unidirectional component is taken from and added to the alternating voltage and wherein a ratio between the unidirectional voltage and the alternating voltage is closely controlled. A portion of the unidirectional voltage signal is taken from resonant circuit stage 11 and fed into a servo stage 14 which is essentially an error circuit. Servo stage 14 also receives an input from a sweep generator or other reference signal circuit 15. The input of sweep generator stage 15 is electrically subtracted from the sampling of the unidirectional output of the resonant circuit stage 11 and the result thereof, which constitutes an error signal, is fed to a servo amplifier stage 16. After the error signal is amplified it is supplied to the radio frequency amplifier stage as a modulating signal and back into the resonant circuit stage.

In operation, the combination of the resonant circuit stage with the servo loop circuit and the sweep generator permits automatic or manual adjustment or sweeping of the magnitude of the voltages without changing their relative proportions. This enables the monopole to pass the mass which is to be preselected thereby. Thus, with the exact circuits described herein, the mass may be swept by a factor of up to 300 to 1.

Let is be assumed that a sawtooth wave is generated by sweep generator 15 for the purpose of periodically sweeping the mass which is to be detected by detector 10. The circuit constants are so chosen that the absolute value of the unidirectional voltage output that is sampled from the resonator circuit and fed to the servo stage is essentially equal to the absolute value of the voltage delivered to the servo stage from the sweep generator stage, but of opposite polarity. As the sweep generator changes voltage in accord with the predetermined pattern there will be an instantaneous and very small voltage difference between these two voltages. This difference is translated by the servo stage into an error signal which is amplified by the servo amplifier and used to amplitude modulate the radio frequency signal at the radio frequency amplifier stage so as to change the magnitude of the voltages generated by the resonant circuit while maintaining their relative relationship. Thus, a change in the voltages supplied to the monopole causes a change in the mass which is selected to be passed from the ion source to the detector. This correction with an error signal occurs almost instantaneously and permits a rapid and constant sweeping of the mass spectrum in accord with the voltage supplied to the servo stage by the sweep generator stage.

Figure 3:
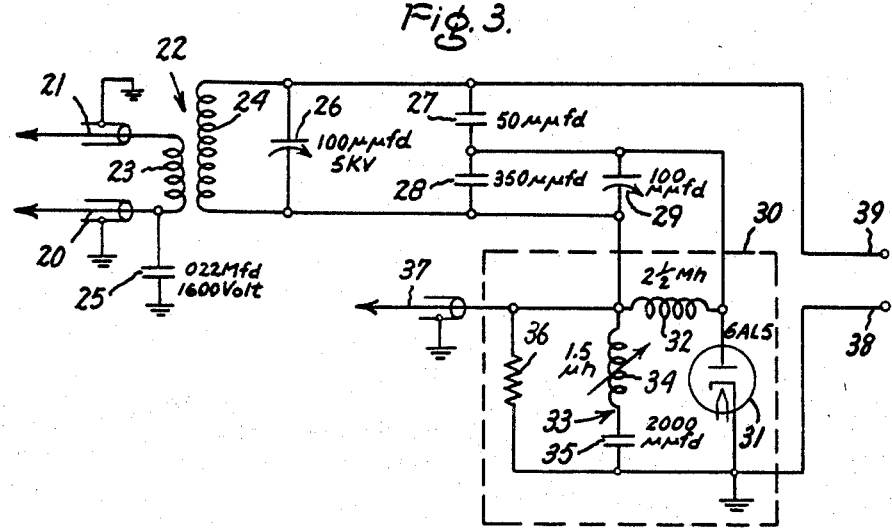
FIGURE 3 is a schematic circuit diagram of the resonant circuit which produces the unidirectional voltage which is associated with the alternating current voltage.

In FIGURE 3 of the drawing the resonator circuit stage is illustrated schematically. In FIGURE 3 a pair of coaxial lines 20 and 21 feed an input from the radio frequency amplifier stage to the resonant circuit stage. The exterior conductor of the coaxial lines is grounded. The input to the resonant circuit is link-coupled by a step-up air transformer 22 having a primary winding 23 and a secondary winding 24. Lead 21 on primary winding 23 is maintained at radio frequency ground potential by a high voltage blocking capacitor 25. The secondary 24 of transformer 22 is adjusted to resonance with a variable capacitor 26. The resulting alternating voltage constitutes a portion of the voltage input to the monopole. The amplitude of this voltage is controlled by the magnitude of the input current from the radio frequency amplifier 13 and by the selection of the turns ratio and coupling sufficient of transformer 22. The generated alternating voltage from the parallel resonant circuit consisting of inductor 24 and capacitances 26, 27, 28 and 29. In the embodiment herein described, the circuit is tuned to a frequency of 1.8 megacycles. Part of the resonant circuit is a capacitance voltage dividing network consisting of capacitors 27 and 28. Since the capacitance of capacitor 28 as trimmed-by-capacitor 29, is approximately 9 times that of capacitance 27, only approximately 10 percent of the total output voltage appears across capacitance 28. The exact amount of the capacitance and of the output voltage across capacitor 28 may be adjusted by trimmer capacitor 29 so that the desired exact percentage of the voltage, as for example 10 percent, may be sampled. This 10 percent fraction is then rectified and filtered by a network represented by the elements comprised within dotted lines block 30. Within dotted line 30, there is a diode rectifier 31, the function of which is never to allow the voltage appearing at the anode thereof to become positive. The rectifier alternating component is then passed through a filter network consisting of a choke coil 32 and a series resonant circuit 33 consisting of variable inductance 34 and fixed capacitance 35. Series resonant circuit 33 serves as a "notch" filter for 1.8 megacycles, the chosen frequency of the monopole. The notch filter is utilized because the total alternating voltage applied to the monopole appears between ground potential and the high voltage side of the parallel resonant circuit. The phase of the residual A.C. that appears across the notch filter is in opposition to that appearing across the main resonant circuit and therefore subtracts from the total voltage supplied to the monopole. This is to be avoided, since it is desirable that this voltage be as high as possible. Therefore, the notch filter short circuits the residual alternating voltage to ground at the operating frequency of the monopole without the necessity of making capacitance 35 large. This facilitates the maximum and predetermined alternating voltage at this frequency being supplied to the monopole while at the same time permitting a high speed servo system. Due to harmonic generation, a doubled frequency of 3.6 megacycles also appears across the notch filter. The magnitude of this voltage is, however, small and does not interfere with the operation of the monopole. A high resistance 36 is supplied in parallel with the notch filter for D.C. leakage purposes. The output from the filter circuit is proportional to the unidirectional voltage which is in a preselected proportion to the peak magnitude of the alternating voltage (in the preferred embodiment about 10 percent) and is used as the feedback signal being fed through coaxial conductor 37 to servo circuit 14. It will be recalled that it is therein matched against a sweep or other reference voltage to generate an error signal to cause regulation, correction or change in the amplitude of the voltages supplied to the monopole. The unidirectional voltage is added to the alternating voltage and the sum appears at terminals 38 and 39 which are connected to the monopole.

The foregoing description of the resonant circuit stage has been predicated upon the supposition that it is desired to sort out positive ions with the monopole. For this reason the signal that is fed to the monopole is an alternating voltage with a negative unidirectional component. If it is desired to sort negative ions with the monopole then the voltage supply should be an alternating voltage with a positive unidirectional component. In this instance, it is only necessary to reverse the connections to the diode 31, grounding the anode and feeding the center tap from capacitors 27 and 28 to the cathode. This will cause the voltages supplied to coaxial line 37 to be a positive voltage. Similarly, the voltage supplied by the sweep generator circuit will vary from zero to some negative voltage so that the comparison to produce an error signal remains the algebraic addition of positive and negative voltages.

Figure 4:
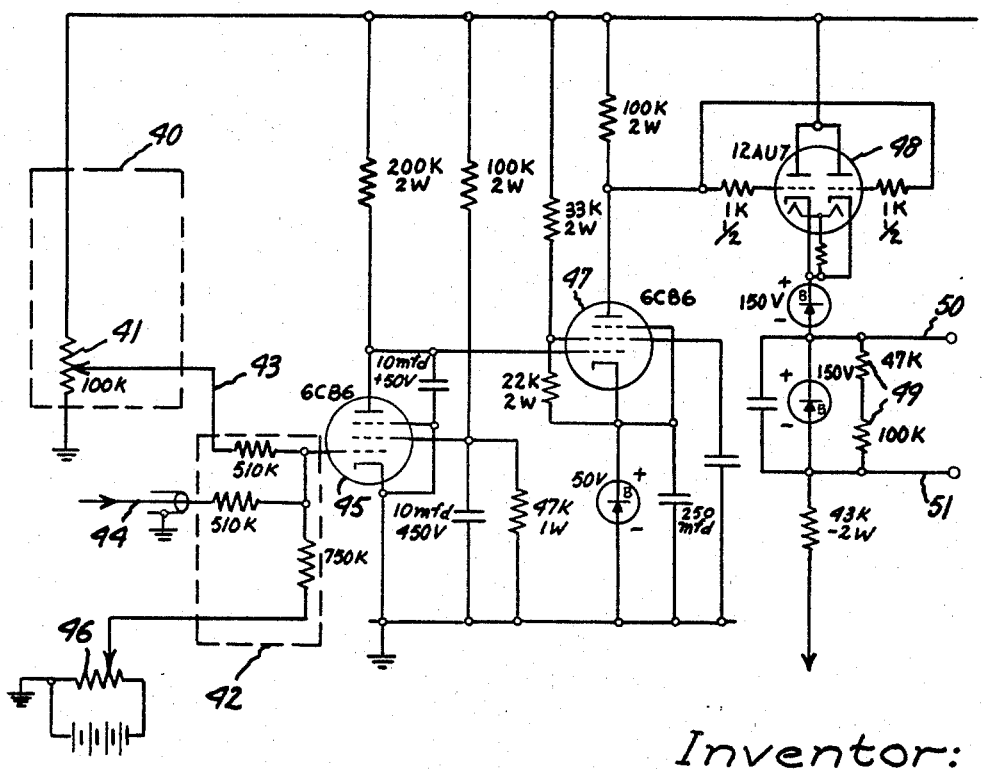
FIGURE 4 is a schematic diagram of the circuit of the servo amplifier and modulator stage of the voltage generator of the invention.

In FIGURE 4 of the drawing the sweep generator stage 15, servo stage 14 and servo amplifier stage 16 are illustrated schematically. In FIGURE 4 the sweep generator stage is represented by the components contained within dotted line block 40. For simplicity of illustration, the simplest type sweep generator is shown, namely a simple, variable potentiometer 41, which may be varied either by a manual adjustment or a motor drive. It will be appreciated, however, that many complicated electronic timing and sweep circuits which are well-known to the art may be substituted to cause any predetermined type of sweeping or other adjustment of the reference signal which is fed to servo circuit 14. Servo circuit 14 is represented within the dotted line block 42.

The servo circuit operates by the comparison of a sampled unidirectional voltage applied at input lead 44, from resonant circuit 11, through a high resistance with a reference signal supplied from the sweep generator through conductor 43 across an identical value resistor. The difference between the two constitutes an error signal and is applied to the control grid of amplifier tube 45. The control grid bias on tube 45 is supplied from a separate bias source represented generally by battery and potentiometer 46. The magnitude of this bias is generally of the order of −10 volts.

The remainder of the servo amplifier circuit is represented by the electron tubes 45, 47 and 48 and their attendant circuit components, all of which are conventional and well-known to the art. The final stage of the servo amplifier stage is a cathode follower tube 48, the output of which is taken across cathode resistors 49 and appears at terminals 50 and 51. This output is supplied to radio frequency amplifier stage 13.

Figure 5:
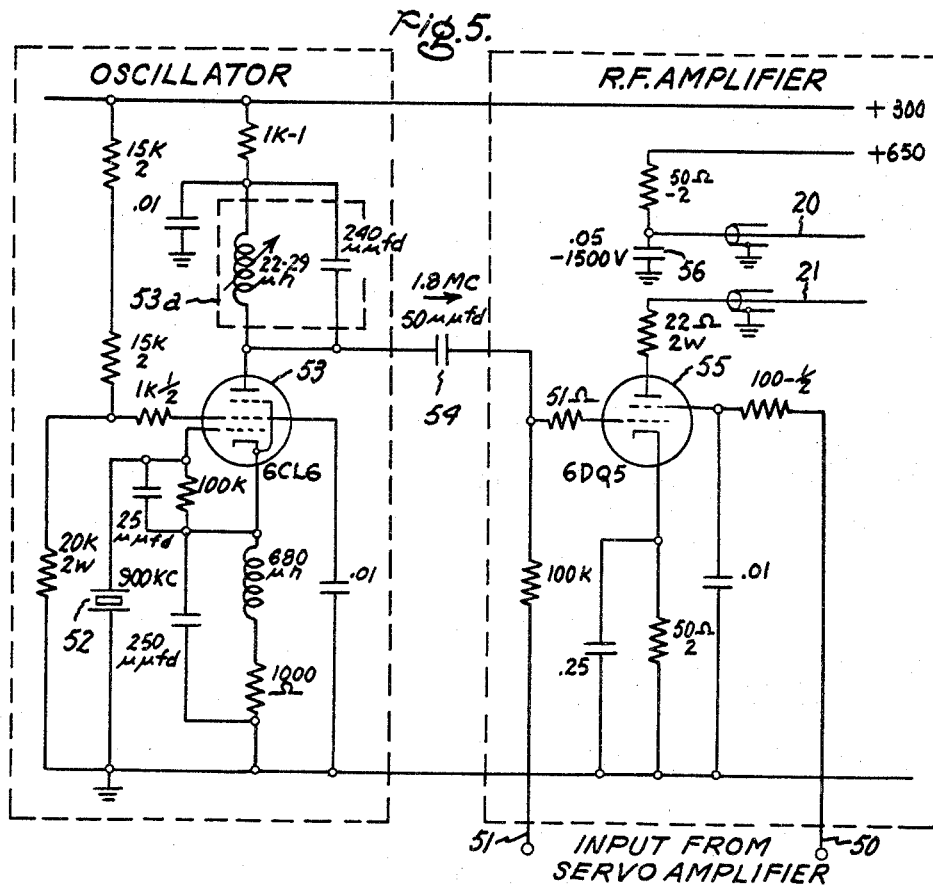
FIGURE 5 is a schematic diagram of the crystal oscillator and radio frequency amplifier stages of the voltage generating circuit of the present invention.

Radio frequency amplifier stage 13 is illustrated in FIGURE 5 of the drawing as is crystal controlled oscillator stage 12. In FIGURE 5, in the illustrated embodiment, a 900 kilocycle crystal 52 controls the oscillations generated by oscillator tube 53 which doubles the frequency in a known manner, the resonant circuit 53a thereof being tuned to 1.8 megacycles. These oscillations are coupled through a coupling capacitor 54 to the control grid of the radio frequency amplifier tube 55. The output of servo amplifier stage 16 is also supplied to the radio frequency oscillator tube 55 through leads 50 and 51 which are coupled to the screen grid and control grid, respectively of the radio frequency amplifier tube. The signals applied to the screen and control grids modulate the amplitude of the 1.8 megacycle oscillations in accord with the error function so as to control the amplitude of the voltage supplied to the monopole to sweep, adjust, or otherwise control the ion mass passed. The predetermined relationship between the alternating and unidirectional voltages is, however, not changed. The output of radio frequency amplifier tube 55 is taken from the anode circuit thereof and is applied through coaxial conductor 21. A high voltage unidirectional voltage, in this instance 650 volts, is also applied to the resonant circuit stage through coaxial conductor 20 which is bypassed to ground by capacitor 56. Coaxial conductors 20 and 21 in FIGURE 5 are the same as coaxial conductors 20 and 21 in FIGURE 3.

By the foregoing description it may be readily appreciated that there is provided a voltage generating and control circuit which supplies a high magnitude operating voltage for a monopole mass filter or analyzer or a similar use which voltage comprises an alternating voltage having a unidirectional voltage component superimposed thereupon which is carefully regulated so as to constitute a preselected fraction of the peak magnitude of the alternating voltage. Additionally, the circuit includes means for taking a sample of the unidirectional voltage which is proportional thereto and comparing it with a reference or sweep voltage to develop an error voltage in a servo loop to amplify the same and feed the same back into the amplifier which generates the alternating voltage to cause the same to be modulated so as to correct, adjust or sweep the amplitude of the voltages produced by the high voltage generating circuit. As is mentioned hereinbefore, these circuits provide for means for changing the absolute and relative magnitude of the unidirectional voltage with respect to the alternating voltage.

The circuits of the present invention are of great advantage and utility in that all inductances and resistances have been eliminated from the high voltage alternating voltage circuit, leaving only capacitors which are highly reliable, low loss and not subject to deterioration with high voltage or current. Also, with the elimination of resistance and inductances from the high voltage circuit the rapidity which the circuit may be swept or adjustments made is greatly increased. By virtue of the foregoing, all of the control of the high voltage, as well as the low voltage, is achieved by the utilization of a control of the low voltage circuit, as included in the dashed block 30 in FIGURE 3 of the drawing. As the result of these novel and useful innovations the monopole mass analyzer or filter voltage generating circuits herein are highly stable, accurate, having a rapid response time and are extremely simple, requiring only a few circuit components which are specifically designed for high voltage and a high current operation.

Figure 6:
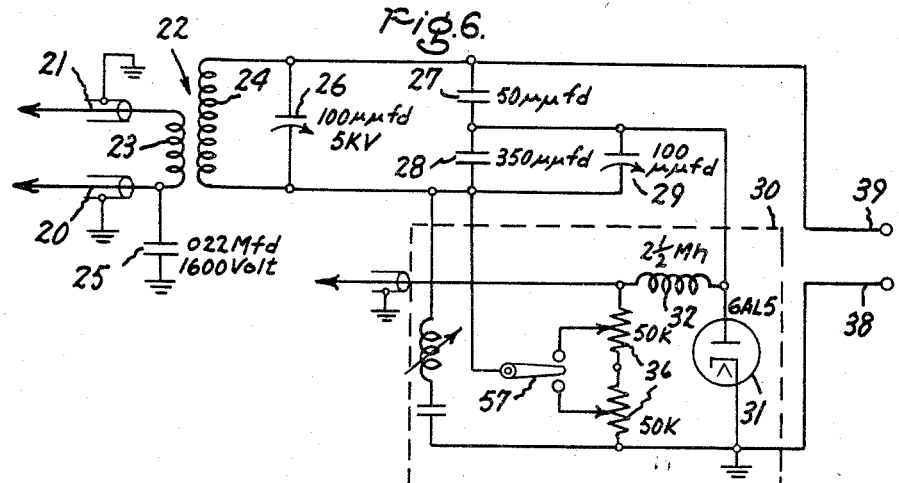
FIGURE 6 is an alternate to the circuit of FIGURE 3.

In FIGURE 6 of the drawing there is illustrated in schematic form an alternative embodiment of the resonator circuit stage of FIGURE 3. In FIGURE 6 like numerals indicate like circuit elements in the embodiment of FIGURE 3. The difference between FIGURE 6 and FIGURE 3 lies in leakage resistance 36, which in FIGURE 3 is represented as a single component. This results in the entire unidirectional voltage output of network 30 being applied to servo circuit 14. This voltage is matched against a sweep or other reference voltage to generate an error signal to cause regulation, correction, or change in the amplitude of the voltages supplied to the monopole. When the entire unidirectional voltage from network 30 is selected it has been found that the range of the monopole is generally of the order of 1 to 300 Atomic Mass Units (AMU). The circuit of FIGURE 6 allows for a selection of only a preselected portion of the unidirectional voltage output of network 30 so as to extend the band width of the monopole to as high as 1–600 AMU without sacrificing resolution. As with the embodiment of FIGURE 3, the preselected portion of the unidirectional voltage is representative of the entire voltage and maintains a preselected relationship thereto.

As illustrated in FIGURE 6 each of separate resistances 36 may be adjustable to select a predetermined portion of the voltage thereacross and switch 57 may conveniently be utilized as a band selection switch which may, for example, change the mass range of the monopole from 1–300 AMU to 1–600 AMU. It will be appreciated that additional resistances 36 could readily be added to provide any desired number of mass range selection.

While the invention has been set forth herein with respect to specific embodiments and circuit parameters it is apparent that many modifications and changes may be readily apparent to those skilled in the art. Accordingly, the appended claims are intended to cover all such modifications and changes as fall within the true spirit and scope of the invention and the specification.

What I claim as new and desire to secure by Letters Patent of the United States is:

1. A circuit for producing an alternating voltage of fixed frequency having a unidirectional component thereof which bears a fixed and predetermined amplitude relation with the peak amplitude of said alternating voltage and comprising: means for generating a controlled radio frequency signal; resonant means for producing from said radio frequency signal a high magnitude alternating voltage of the same frequency; capacitive means for taking from said alternating voltage a predetermined fraction thereof and producing therefrom a unidirectional voltage having the same magnitude and for adding at least a representative portion of said unidirectional voltage to said high magnitude alternating voltage; means for sampling a portion of said unidirectional voltage and comparing the same with a variable reference signal to produce an error voltage; means for amplifying said error voltage and applying said amplified error voltage to said alternating voltage signal to modulate the amplitude thereof and control the amplitude of said high magnitude alternating voltage and said unidirectional voltage without changing the proportional relationship therebetween.

2. A circuit for producing an alternating voltage having a unidirectional component which bears a fixed and predetermined relationship to the peak magnitude of said alternating voltage and comprising: a crystal controlled oscillator for generating an alternating voltage signal; amplifying means for increasing the amplitude of said generated alternating signal; voltage generating means for producing a high magnitude voltage at the frequency of said alternating voltage signal including a resonant circuit tuned to the frequency of the output of said alternating voltage generator; a capacitor voltage divider for sampling a predetermined and adjustable fraction of the output of said alternating voltage generator; a rectifying network including a rectifying device and a filter circuit for producing a unidirectional voltage having a predetermined proportional relationship to the peak value of said alternating voltage and for adding at least a representative portion of the same thereto; a servo circuit comprising means for generating a reference signal and means for comparing a sample of said unidirectional voltage with said reference signal to produce an error voltage; an error signal amplifier to amplify the magnitude of said error voltage and to apply said amplified error voltage to said radio frequency amplifier to cause amplitude modulation of said generated radio frequency signal to control the magnitude of said alternating voltage and said unidirectional voltage without changing the proportional relationship therebetween.

3. A voltage generating circuit for a monopole mass analyzer comprising a crystal controlled oscillator for generating a radio frequency signal at the operating frequency of said monopole; a radio frequency amplifier for amplifying and modulating said signal; a voltage generating circuit coupled inductively with said radio frequency amplifier and including a resonant circuit tuned to the monopole frequency for generating a high magnitude alternating voltage; a capacitor voltage dividing network for sampling a predetermined and adjustable fraction of said alternating voltage; a voltage rectifying circuit for detecting and filtering said sampled portion of said alternating voltage and including a rectifying electron discharge device and a filter network and means for adding at least a preselected representative portion of the rectified unidirectional voltage to said alternating voltage and for applying said voltages to said monopole; a feedback circuit including a signal generator and means for sampling a portion of said unidirectional voltage and supplying the same to a voltage comparing stage; a voltage comparing stage including identical resistive elements for balancing out opposite-polarity voltages to produce an error voltage; an error voltage amplifier connected to said balancing circuit; means connecting said error voltage amplifier to said radio frequency amplifier and applying the output of said error voltage amplifier to said radio frequency amplifier to modulate the amplitude of the generated radio frequency oscillations and thereby control the magnitude of the unidirectional and alternating voltages supplied to said monopole while maintaining the same proportional relationship therebetween.

4. A voltage generating circuit for a monopole mass analyzer comprising a crystal controlled oscillator for generating a radio frequency signal at the operating frequency of said monopole; a radio frequency amplifier for amplifying and modulating said signal; a voltage generating circuit coupled inductively with said radio frequency amplifier and including a resonant circuit tuned to the monopole frequency for generating a high magnitude alternating voltage; a capacitive voltage dividing network for sampling a predetermined and adjustable fraction of said alternating voltage; a voltage rectifying circuit for detecting and filtering said sampled portion of said alternating voltage and including a rectifying electron discharge device and a filter network, voltage selecting means for selecting at least two values of unidirectional voltage which bear a preselected and representative relation to the rectified and filtered output of said voltage rectifying circuit, switch means for selecting one of said voltages and means for adding the selected unidirectional voltage to said alternating voltage and for applying said voltages to said monopole; a feedback circuit including a signal generator and means for sampling a portion of said unidirectional voltage and supplying the same to a voltage comparing stage; a voltage comparing stage including identical resistive elements for balancing out opposite-polarity voltages to produce an error voltage; an error voltage amplifier connected to said balancing circuit; means connecting said error voltage amplifier to said radio frequency amplifier and applying the output of said error voltage amplifier to said radio frequency amplifier to modulate the amplitude of the generated radio frequency oscillations and thereby control the magnitude of the unidirectional and alternating voltages supplied to said monopole while maintaining the same proportional relationship therebetween.

References Cited

UNITED STATES PATENTS

| | | | |
|---|---|---|---|
| 2,808,516 | 10/1957 | Lanneau | 250—41.9 |
| 2,915,629 | 12/1959 | Wolf | 328—21 |
| 2,950,389 | 8/1960 | Paul et al. | 250—41.9 |
| 3,197,633 | 7/1965 | Von Zahn | 250—41.9 |

WILLIAM F. LINDQUIST, *Primary Examiner.*